United States Patent
Hunt et al.

(10) Patent No.: US 12,520,764 B2
(45) Date of Patent: Jan. 13, 2026

(54) REEL ASSEMBLY WITH RETRACTABLE SENSOR ARM FOR AN AGRICULTURAL HEADER

(71) Applicant: CNH Industrial America LLC, New Holland, PA (US)

(72) Inventors: Cory Douglas Hunt, Millersville, PA (US); Herbert Max Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 840 days.

(21) Appl. No.: 17/788,351

(22) PCT Filed: Dec. 22, 2020

(86) PCT No.: PCT/US2020/066516
§ 371 (c)(1),
(2) Date: Jun. 23, 2022

(87) PCT Pub. No.: WO2021/133755
PCT Pub. Date: Jul. 1, 2021

(65) Prior Publication Data
US 2023/0025352 A1     Jan. 26, 2023

Related U.S. Application Data

(60) Provisional application No. 62/952,865, filed on Dec. 23, 2019.

(51) Int. Cl.
*A01D 57/04* (2006.01)
*A01D 41/127* (2006.01)
*A01D 41/14* (2006.01)

(52) U.S. Cl.
CPC ........... *A01D 57/04* (2013.01); *A01D 41/127* (2013.01)

(58) Field of Classification Search
CPC .. A01B 63/002; A01D 41/127; A01D 41/141; A01D 41/1271; A01D 57/00; A01D 57/02; A01D 57/04; A01D 75/00
See application file for complete search history.

(56) References Cited

U.S. PATENT DOCUMENTS 3,906,710 A      9/1975  Pask
4,507,910 A  *   4/1985  Thornley ............... A01D 57/00
                                                56/DIG. 15

(Continued)

FOREIGN PATENT DOCUMENTS

DE      19956643 A1    1/2001
GB       2173309 A    10/1986
WO    2019/140512 A1   7/2019

OTHER PUBLICATIONS

International Search Report and Written Opinion for PCT Application No. PCT/US2020/066516 dated Mar. 24, 2021 (16 pages).

*Primary Examiner* — Joseph M Rocca
*Assistant Examiner* — Robert E Pezzuto
(74) *Attorney, Agent, or Firm* — Buchanan Ingersoll & Rooney PC (57) ABSTRACT

A reel assembly for an agricultural header includes a reel arm configured to couple to a frame of the agricultural header and configured to support a reel of the reel assembly. The reel assembly further includes a device mounting assembly movably coupled to the reel arm and configured to support a device that is configured to monitor a terrain feature. The device mounting assembly is configured to move between an extended position and a retracted position relative to the frame to move the device between a first position corresponding to the extended position of the device mounting assembly and a second position corresponding to the retracted position of the device mounting assembly. The device mounting assembly is configured to (Continued)

enable the device to monitor the terrain feature at the first position and the second position.

16 Claims, 6 Drawing Sheets

(56) References Cited

U.S. PATENT DOCUMENTS

| | | | |
|---|---|---|---|
| 4,645,320 A * | 2/1987 | Muelling | G03B 29/00 |
| | | | 396/419 |
| 5,015,847 A | 5/1991 | Rouillon | |
| 5,299,413 A | 4/1994 | Gale | |
| 6,244,024 B1 | 6/2001 | Diekhans et al. | |
| 6,397,569 B1 | 6/2002 | Homburg et al. | |
| 6,791,488 B2 * | 9/2004 | Diekhans | A01D 41/141 |
| | | | 342/123 |
| 7,155,888 B2 | 1/2007 | Diekhans | |
| 2019/0161208 A1 | 5/2019 | Sun et al. | |
| 2022/0138925 A1 * | 5/2022 | Anderson | G06T 7/62 |
| | | | 382/110 |

* cited by examiner

REEL ASSEMBLY WITH RETRACTABLE SENSOR ARM FOR AN AGRICULTURAL HEADER

BACKGROUND

The present disclosure relates generally to a reel assembly for an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel is typically supported by multiple arms extending from a frame of the header. The reel assembly may include one or more actuators configured to drive the arms to rotate, thereby adjusting the position of the reel relative to the frame of the header.

BRIEF DESCRIPTION

In one embodiment, a reel assembly for an agricultural header includes a reel arm configured to couple to a frame of the agricultural header and configured to support a reel of the reel assembly. Additionally, the reel assembly includes a device mounting assembly movably coupled to the reel arm and configured to support a device that is configured to monitor a terrain feature. The device mounting assembly is configured to move between an extended position and a retracted position relative to the frame to move the device between a first position corresponding to the extended position of the device mounting assembly and a second position corresponding to the retracted position of the device mounting assembly. The device mounting assembly is configured to enable the device to monitor the terrain feature at the first position of the device and at the second position of the device.

In one embodiment, a device mounting assembly for an agricultural header includes a support structure configured to couple to an arm of the agricultural header, a device mounting structure coupled to the support structure, and a device coupled to the device mounting structure and configured to monitor a terrain feature. The support structure is configured to move between an extended position and a retracted position relative to a frame of the agricultural header to move the device between a first position corresponding to the extended position and a second position corresponding to the retracted position. The device mounting assembly is configured to maintain an orientation between the device and a ground on which the agricultural header is positioned at the first position of the device and at the second position of the device.

In one embodiment, a header for an agricultural harvester includes a cutter bar assembly coupled to a frame of the header and configured to cut crops as the agricultural harvester travels through a field, an arm coupled to the frame of the header, and a device mounting assembly movably coupled to the arm and configured to support a device that is configured to monitor a terrain feature. The device mounting assembly is configured to move between an extended position and a retracted position relative to the frame. The device mounting assembly is configured to position the device to enable the device to monitor the terrain feature while the device mounting assembly is in the extended position and in the retracted position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
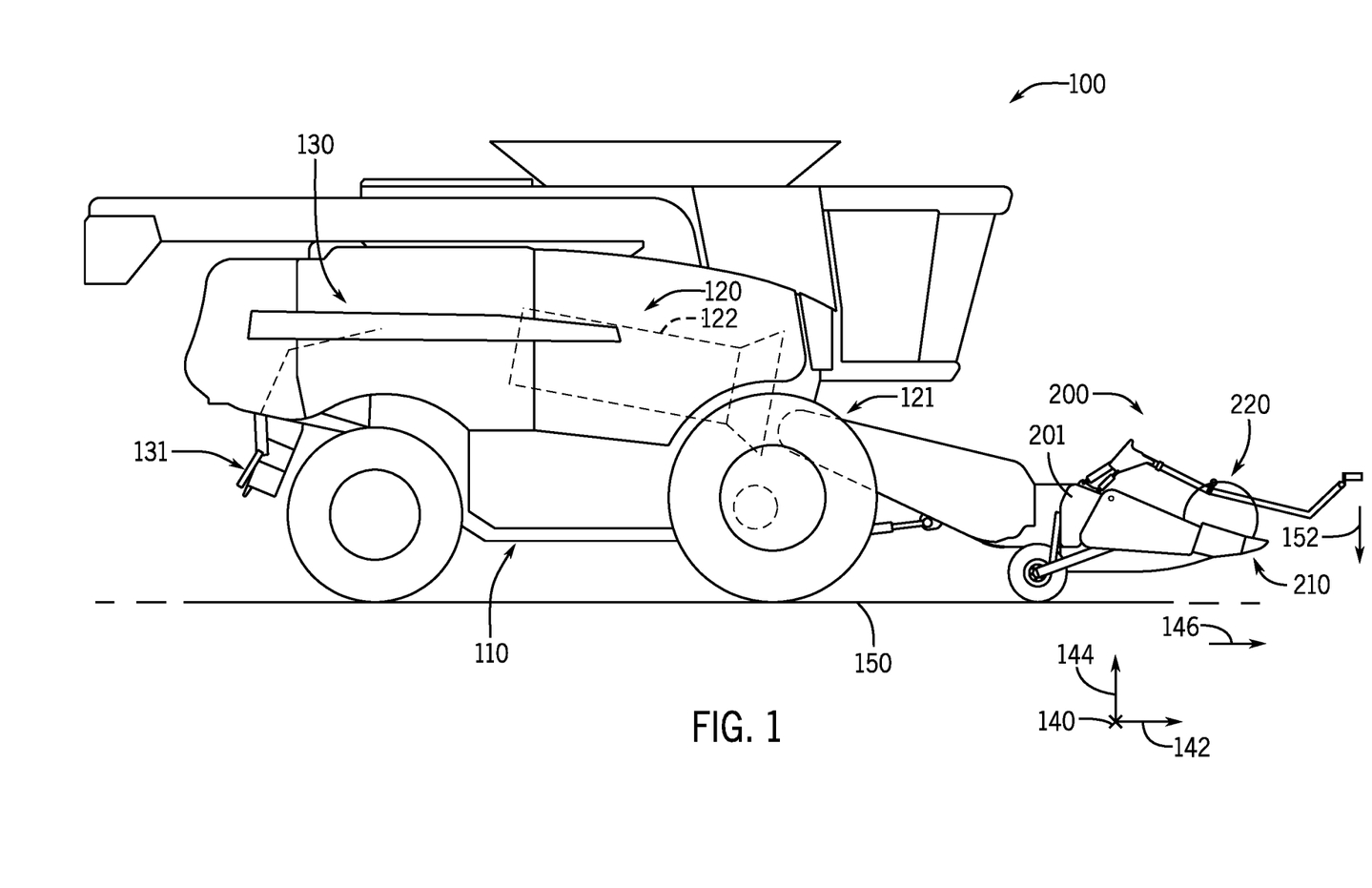
FIG. 1 is a side view of an embodiment of a harvester, in accordance with embodiments of the present disclosure.

Turning to the drawings, FIG. 1 is a side view of an embodiment of a harvester 100 (e.g., agricultural harvester) having a header 200 (e.g., agricultural header). The harvester 100 includes a chassis 110 configured to support the header 200 and an agricultural crop processing system 120. As described in greater detail below, the header 200 is configured to cut crops and to transport the cut crops toward an inlet 121 of the agricultural crop processing system 120 for further processing of the cut crops. The agricultural crop processing system 120 receives cut crops from the header 200 and separates desired crop material from crop residue. For example, the agricultural crop processing system 120 may include a thresher 122 having a cylindrical threshing rotor that transports the crops in a helical flow path through the harvester 100. In addition to transporting the crops, the thresher 122 may separate certain desired crop material (e.g., grain) from the crop residue (e.g., husks and pods) and may enable the desired crop material to flow into a cleaning system located beneath the thresher 122. The cleaning system may remove debris from the desired crop material and transport the desired crop material to a storage compartment within the harvester 100. The crop residue may be transported from the thresher 122 to a crop residue handling system 130, which may remove the crop residue from the harvester 100 via a crop residue spreading system 131 positioned at the aft end of the harvester 100. To facilitate discussion, the harvester 100 and/or its components may be described with reference to a lateral axis or direction 140, a longitudinal axis or direction 142, and a vertical axis or direction 144. The harvester 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto belts that convey the cut crops toward the inlet 121 of the agricultural crop processing system 120. As discussed in detail below, the reel assembly 220 includes a reel having multiple fingers extending from a central framework. The central framework is driven to rotate, such that the fingers engage the crops and urge the crops toward the cutter bar assembly 210 and the belts. Additionally, the reel may be supported by multiple arms (e.g., reel arms) that are coupled to a frame 201 of the header 200. Each arm of the multiple arms may be coupled to the frame 201 via a respective pivot joint. For example, one pivot joint is configured to enable a first arm of the multiple arms to pivot (e.g., about the lateral axis 140) relative to the frame 201 of to the header 200, and another pivot joint is configured to enable a second arm of the multiple arms to pivot (e.g., about the lateral axis 140) relative to the frame 201 of the header 200.

In the disclosed embodiments, the reel assembly 220 may include a device mounting assembly. In particular, at least one of the multiple arms may be coupled to a device mounting structure that supports a device. The device may be configured to facilitate detection of terrain features (e.g., a height/position of the crops and/or surface features of the ground) as the harvester 100 travels through the field. For example, the device may be a sensor that is configured to detect the terrain features and to send a signal indicative of the terrain features to an electronic controller for processing. As another example, the device may be a light source (e.g., visible light source) that is configured to illuminate the terrain features to enable detection and visualization by an operator of the harvester 100. In some embodiments, the device mounting assembly may include both the sensor and the light source. Indeed, it should be appreciated that the device mounting assembly may include any number of devices (e.g., 1, 2, 3, 4, 5 or more) and any of a variety of devices, such as any of a variety of devices that emit electromagnetic waves (e.g., sensors; emitters; light sources), coupled to the device mounting structure. The device mounting assembly may be configured to move between an extended position and a retracted position with respect to the reel arm and the frame 201 generally. Advantageously, in the disclosed embodiments, the reel assembly 220 (e.g., the device mounting assembly of the reel assembly 220) is configured to point the device downward at the ground 150 in both the extended and retracted positions of the device mounting assembly, thereby enabling the device to detect and/or to monitor the terrain features in both the extended and retracted positions. For example, the device mounting assembly may be configured to maintain (e.g., substantially maintain) an orientation of the device relative to a ground 150 (e.g., ground surface) and/or relative to a gravity vector 152 (e.g., pointing toward a center of Earth) in both the extended and retracted positions of the device mounting assembly.

Figure 2:
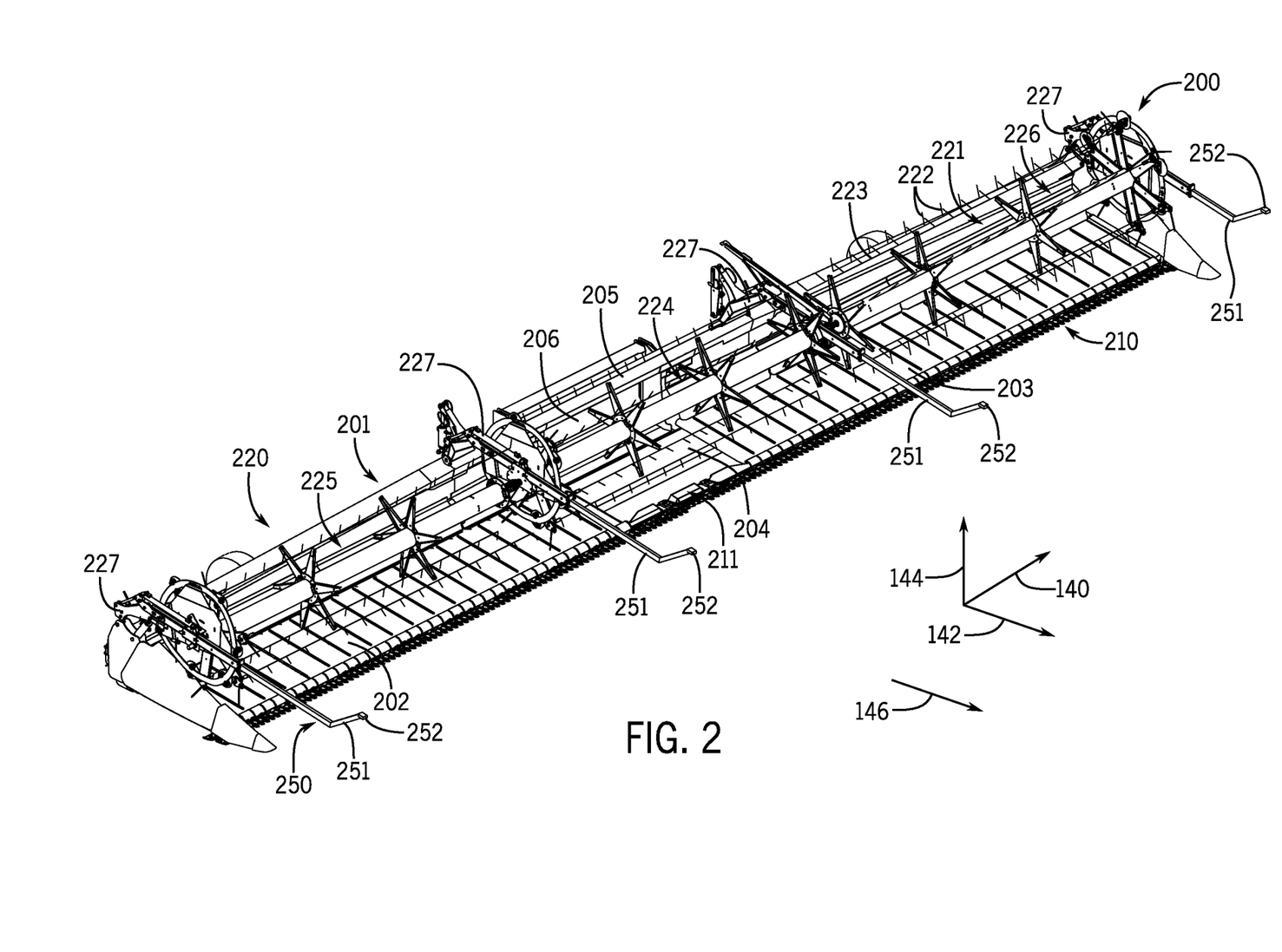
FIG. 2 is a perspective view of an embodiment of a header that may be employed within the harvester of FIG. 1, in accordance with embodiments of the present disclosure.

FIG. 2 is a perspective view of an embodiment of the header 200 that may be employed within the harvester 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., the extent of the header 200 along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at the lateral center of the header 200. However, in other embodiments, the blade support/moving blade assembly may be driven by another suitable mechanism (e.g., located at any suitable position on the header 200). As the harvester 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first lateral belt 202 on a first lateral side of the header 200 and a second lateral belt 203 on a second lateral side of the header 200, opposite the first lateral side. Each belt is driven to rotate by a suitable drive mechanism, such as an electric motor or a hydraulic motor. The first lateral belt 202 and the second lateral belt 203 are driven such that the top surface of each belt moves laterally inward. In addition, the header 200 includes a longitudinal belt 204 positioned between the first lateral belt 202 and the second lateral belt 203 along the lateral axis 140. The longitudinal belt 204 is driven to rotate by a suitable drive mechanism, such as an electric motor or a hydraulic motor. The longitudinal belt 204 is driven such that the top surface of the longitudinal belt 204 moves rearwardly relative to the direction of travel 146.

In the illustrated embodiment, the crops cut by the cutter bar assembly 210 are directed toward the belts at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the belts. The cut crops that contact the top surface of the lateral belts 202, 203 are driven laterally inwardly to the longitudinal belt 204 due to the movement of the lateral belts 202, 203. In addition, cut crops that contact the longitudinal belt 204 and the cut crops provided to the longitudinal belt 204 by the lateral belts 202, 203 are driven rearwardly relative to the direction of travel 146 due to the movement of the longitudinal belt 204. Accordingly, the belts move the cut agricultural crops through an opening 206 in the header 200 to the inlet 121 of the agricultural crop processing system 120 (FIG. 1).

In the illustrated embodiment, the reel 221 includes multiple sections coupled to one another. In particular, the reel 221 includes a center section 224 (e.g., positioned forward of a center section 205 of the frame 201 of the header 200 relative to the direction of travel 146), a first wing section 225, and a second wing section 226. In the illustrated embodiment, each section of the reel 221 is supported by one or more arms 227 (e.g., reel arms) that are coupled to the frame 201 of the header 200. While the reel 221 includes three sections 224, 225, 226 coupled to the frame 201 of the header 200 via four arms 227, it should be appreciated that the reel 221 may include any number of sections coupled to the frame 201 of the header 200 via any number of arms (e.g., one section coupled to the frame 201 of the header 200 via two arms; two sections coupled to the frame 201 of the header 200 via three arms; four sections coupled to the frame 201 of the header 200 via five arms).

As discussed in detail below, regardless of the number of arms 227, each arm 227 is pivotally coupled to the frame 201 of the header 200 via a respective pivot joint. The pivot joints are configured to enable the arms 227 to pivot (e.g., about the lateral axis 140) relative to the frame 201 of the header 200. An actuator may be coupled to each arm 227 and configured to drive the respective arm 227 to rotate, thereby controlling a position of the reel 221 relative to the frame 201 of the header 200 along the vertical axis 144. Such a configuration may enable the reel 221 to be positioned at an appropriate position along the vertical axis 144 to engage the crops to prepare the crops to be cut by the cutter bar assembly 210 and/or to urge the cut crops toward the belts 202, 203, 204, for example. In some embodiments, each section of the reel 221 may also be configured to slide along its respective arm(s) to enable the reel 221 to move along the longitudinal axis 142 relative to the frame 201 of the header 200. Such a configuration may enable at least a portion of the reel assembly 220 to be positioned forward of the cutter bar assembly 210 relative to the direction of travel 146 to enable the reel assembly 220 to engage the crop to prepare the crop to be cut by the cutter bar assembly 210, for example.

As noted above, the reel assembly 220 may include a device mounting assembly 250. The device mounting assembly 250 may include one or more support structures 251 (e.g., brackets, reel arm extensions) and one or more devices 252 (e.g., sensors, emitters, light sources). The one or more devices 252 may be configured to facilitate detection of terrain features, such as a height/position of the crops and/or surface features of the ground, as the harvester 100 travels through the field. In the illustrated embodiment, each of the arms 227 is coupled to a respective support structure 251 that supports a respective device 252. However, only some of the arms 227 may be coupled to a respective support structure 251 that supports a respective device 252. For example, only the laterally-outer arms 227 may be coupled to a respective support structure 251 and a respective device 252, only the laterally-inner arm(s) 227 may be coupled to a respective support structure 251 and a respective device 252, and/or every other arm 227 (e.g., non-adjacent or alternating arms) may be coupled to a respective support structure 251 and a respective device 252. As discussed in more detail below, regardless of the number of support structures 251 and devices 252 included in the device mounting assembly 250, each device mounting assembly 250 may be configured to move between an extended position and a retracted position relative to the respective arm 227 and the frame 201. Additionally, the device mounting assembly 250 may be configured to point the device 252 downward at the ground 150 regardless of the position of the arm 227, thereby enabling the device 252 to detect and/or to monitor the terrain features in both the extended and retracted positions. For example, in some embodiments, an orientation of each device 252 relative to the ground 150 and/or the gravity vector 152 (FIG. 1) may be maintained in both the extended and retracted positions of the device mounting assembly 250.

Figure 3:
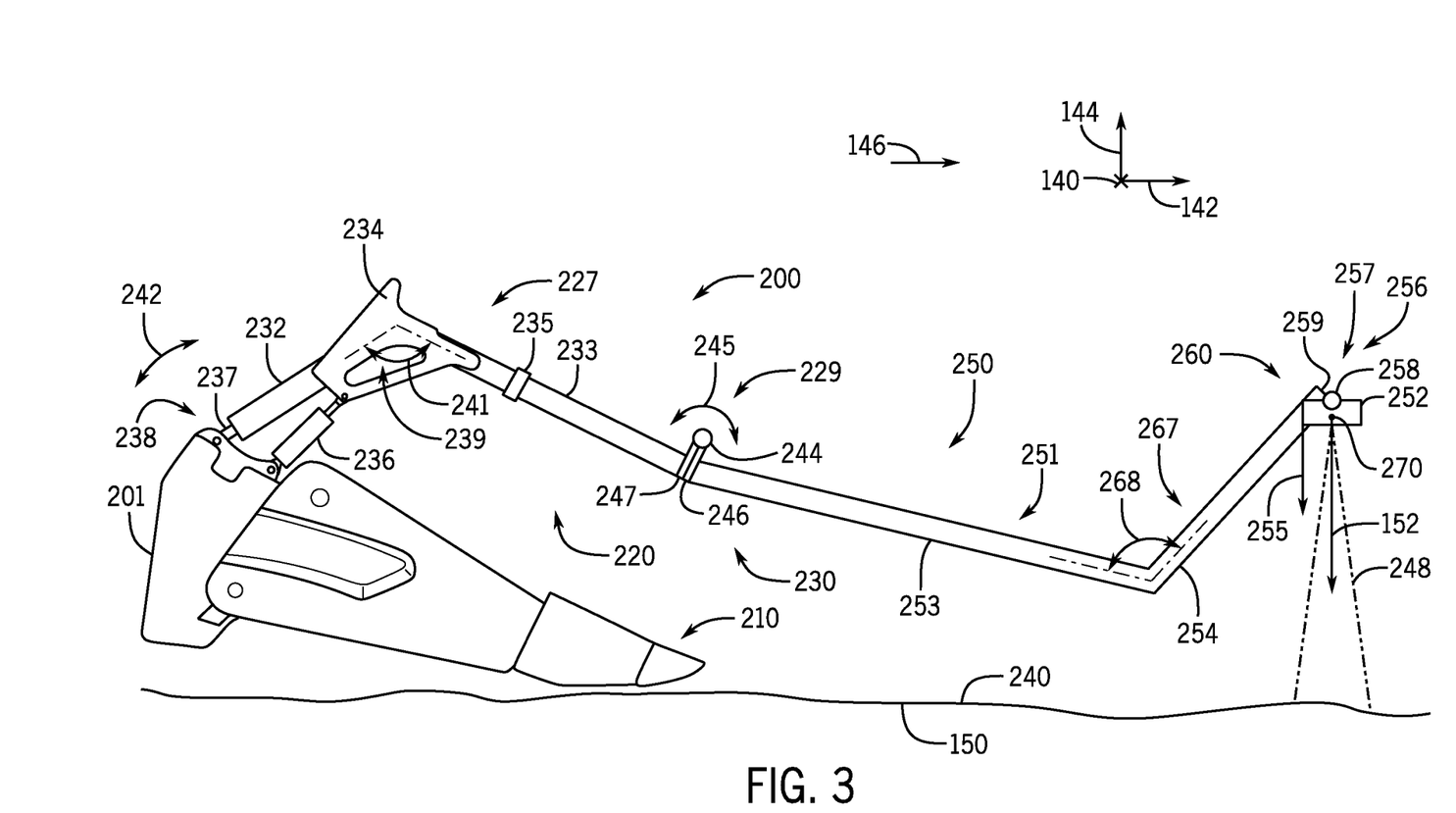
FIG. 3 is a side view of an embodiment of a portion of the header of FIG. 2, in which a reel assembly having a device mounting assembly is in an extended position relative to a frame of the header, in accordance with embodiments of the present disclosure.
Figure 4:
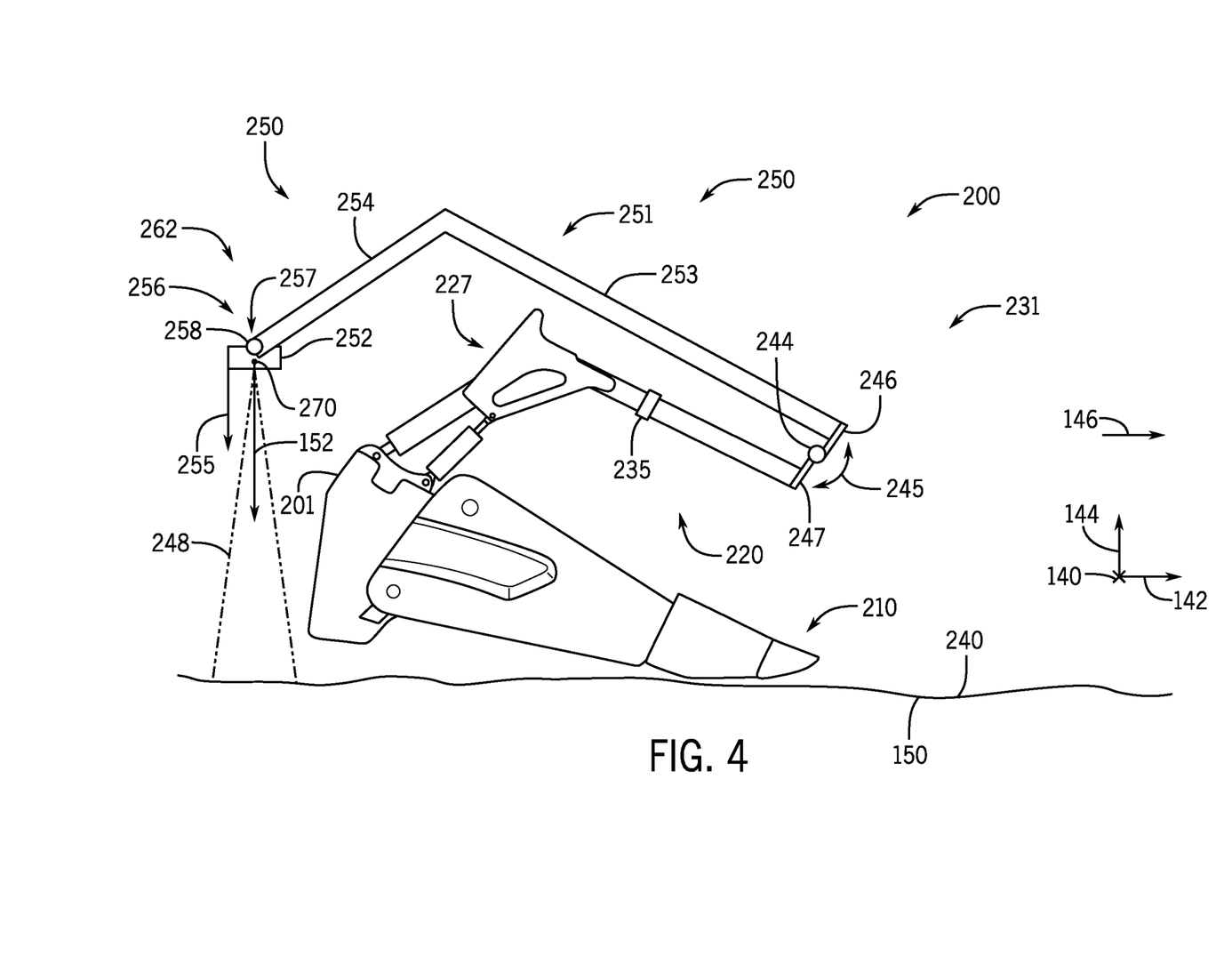
FIG. 4 is a side view of the portion of the header of FIG. 3, in which the reel assembly having the device mounting assembly is in a retracted position relative to the frame of the header, in accordance with embodiments of the present disclosure.

FIG. 3 is a side view of a portion of the header 200 with the device mounting assembly 250 in an extended position 230 relative to the arm 227 and the frame 201 of the header 200, and FIG. 4 is a side view of the portion of the header 200 with the device mounting assembly 250 in a retracted position 231 (e.g., a stored position, a stowed position) relative to the arm 227 and the frame 201. In certain embodiments, the device mounting assembly 250 may be disposed in the extended position 230 during operation of the header 200, such as during a harvesting operation and while the header 200 is moving over/along the ground 150 and forward along the longitudinal axis 142 (e.g., in the direction of travel 146). In some embodiments, the device mounting assembly 250 may be disposed in the retracted position 231 during transportation of the header 200 and/or during certain operations of the header 200. For example, the retracted position 231 may provide a more compact configuration of the header 200 relative to the extended position 230, thereby facilitating transportation (e.g., loading, unloading, maneuvering) of the header 200. Additionally, the retracted position 231 may provide a more compact configuration of the header 200 relative to the extended position 230 during a harvesting operation, such as while the header 200 is traveling adjacent to obstacles (e.g., a fence, vegetation, rocks, a roadway, and/or other obstacles) within and/or adjacent to a field, thereby facilitating movement of the header 200 during the harvesting operation.

In certain embodiments, the device mounting assembly 250, the header 200, and/or the harvester 100 generally (FIG. 1) may include an electronic controller configured to control movement of the device mounting assembly 250 between the extended position 230 and retracted position 231. For example, the controller may movement of the device mounting assembly 250 upon input by an operator of the harvester 100 or in response to signals from a sensor, such as the device 252 or another sensor that detects an obstacle. In some embodiments, the device mounting assembly 250 may be manually controlled (e.g., in place of or in addition to the electronic control by the controller) by the operator manual folding, lifting, and/or pulling the device mounting assembly 250.

The arm 227 includes a first arm portion 232 and a second arm portion 233 that are coupled together (e.g., in a fixed position relative to one another). In the illustrated embodiment, the first arm portion 232 and the second arm portion 233 are coupled together another via one or more plates 234 (e.g., on opposite lateral sides of the arm portions 232, 233), although the first arm portion 232 and the second arm portion 233 may be coupled together via any suitable fasteners (e.g., bolts, pins, welds).

It should be appreciated that the arm 227 may have any of a variety of shapes or configurations. For example, the first arm portion 232 and the second arm portion 233 may be physically separate structures that are coupled together, or the first arm portion 232 and the second arm portion 233 may be formed as a one-piece structure. Furthermore, the arm 227 may be formed from any number of portions (e.g., 1, 2, 3, 4, 5, or more) having any of a variety of dimensions (e.g., lengths). Moreover, the arm 227 may have any number (e.g., 1, 2, 3, 4, 5, or more) of bends and/or the arm portions may be positioned at any of a variety of angles relative to one another. The reel 221 (FIG. 2) may be coupled to the arm 227 via a slide 235 (e.g., carriage) that enables the reel 221 to slide along the second arm portion 233 to move along the longitudinal axis 142 relative to the frame 201 of the header 200. To facilitate discussion and for image clarity, the reel 221 and the other associated components that couple the reel 221 to the arm 227 are omitted in FIGS. 3 and 4.

The header 200 includes an actuator 236 that may be controlled (e.g., via an electronic controller and/or manually via an operator) to rotate the arm 227 generally about the lateral axis 140. As shown, the actuator 236 extends between the frame 201 of the header 200 and the one or more plates 234, although the actuator 236 may be positioned at any suitable location and may be coupled to any suitable structures (e.g., the first arm portion 232, the second arm portion 233) to drive rotation of the arm 227 about the lateral axis 140.

In the illustrated embodiment, the device mounting assembly 250 includes the support structure 251 and the device 252, which may have a field of view of detection 248. The support structure 251 includes a first portion 253 and a second portion 254 that are coupled together (e.g., in a fixed position relative to one another). In the illustrated embodiment, the first portion 253 and the second portion 254 are formed as a one-piece structure. However, the first portion 253 and the second portion 254 may be physically separate structures that are coupled together another via any suitable fasteners (e.g., plates, bolts, pins, welds). It should also be appreciated that the support structure 251 may have any of a variety of shapes or configurations. For example, the support structure 251 may be formed from any number of portions (e.g., 1, 2, 3, 4, 5, or more) having any of a variety of dimensions (e.g., lengths). Moreover, the support structure 251 may have any number (e.g., 1, 2, 3, 4, 5, or more) of bends and/or the portions may be positioned at any of a variety of angles relative to one another.

As shown, the support structure 251 is coupled to the arm 227 via a joint assembly 229 of the device mounting assembly 250. The joint assembly 229 includes a pin 244 (e.g., hinge) coupled to the arm 227 and the support structure 251, such that the support structure 251 is configured to rotate, as indicated by arrows 245, about the pin 244 and relative to the arm 227 between the extended position 230 and the retracted position 231. The joint assembly 229 enables the device mounting assembly 250 to fold vertically upwardly relative to the ground surface 240 and rearwardly relative to the direction of travel 146 of the header 200 to reach the retracted position 231 of FIG. 4 (e.g., from the extended position 230 of FIG. 3).

As illustrated, the device mounting assembly 250 includes a support bracket 246 coupled (e.g., rigidly coupled) to the support structure 251 and an arm bracket 247 coupled (e.g., rigidly coupled) to the arm 227. The support bracket 246 and the arm bracket 247 are rotatably coupled to the pin 244, thereby enabling the support structure 251 to rotate relative to the arm 227. In certain embodiments, the support bracket 246 may be integrally formed with the support structure 251, and/or the arm bracket 247 may be integrally formed with the arm 227. In some embodiments, the support bracket 246 and/or the arm bracket 247 may be omitted, such that the pin 244 is directly rotatably coupled to the support structure 251 and/or the arm 227.

The device mounting assembly 250 includes a device mounting structure 256 coupled to the device 252 and the support structure 251. In some embodiments, the device mounting structure 256 is configured to adjust the device 252 relative to the frame 201 of the header 200 and/or relative to the arm 227 in order to point the device 252 downward at the ground 150 regardless of the position of the arm 227 (e.g., at the position 230, at the position 231, and/or at other suitable positions of the arm 227 relative to the frame 201), thereby enabling the device 252 to detect and/or to monitor the terrain features in both the extended position 230 and the retracted position 231 (e.g., the field of view of detection 248 is toward the ground 150) and/or during movement between the extended position 230 and the retracted position 231. For example, the device mounting structure 256 may be configured to maintain an orientation of the device 252 relative to the ground 150 and/or the gravity vector 152 while the device mounting assembly 250 is in the extended position 230 and the retracted position 231. In some embodiments, the device mounting structure 256 may be configured to maintain the orientation of the device 252 relative to the ground 150 and/or the gravity vector 152 as the device mounting assembly 250 moves between the extended position 230 and the retracted position 231. In such cases, an angle (e.g., device-to-ground angle) may be maintained between an axis 255 (e.g., a device axis) of the device 252 and the ground 150 and/or the gravity vector 152. In some such cases, the axis 255 of the device 252 may be oriented to generally align with the gravity vector 152 and/or may be oriented so that a center axis of electromagnetic waves emitted by the device 252 generally align with the gravity vector 152. However, the axis 255 of the device 252 may be at a different angle relative to the gravity vector 152. For example, the axis 255 may be oriented so that the center axis of the electromagnetic waves emitted by the device 252 generally travel rearwardly or forward relative to the direction of travel 146 (e.g., in both the extended position 230 and the retracted position 231). It should be appreciated that the device mounting assembly 250 may also be configured to adjust the device 252 relative to the frame 201 of the header 200 and/or relative to the arm 227 in order to point the device 252 downward toward the ground 150 and/or to maintain the angle as the arm 227 moves relative to the frame 201 of the header 200.

As illustrated, the gravity vector 152 extends generally from a center of mass 270 of the device 252 toward the ground 150. In certain embodiments, the gravity vector 152 may extend from another portion of the device 252 and/or another portion of the header 200. In some embodiments, the gravity vector 152 may extend from the center of mass 270 of the device 252 toward the center of Earth. In certain embodiments, the center of mass 270 may be a center of mass of the device mounting structure 251 and/or of the device mounting assembly 250.

As shown, the device mounting structure 256 of the device mounting assembly 250 includes a gimbal 258 configured to maintain the angle between the axis 255 and the ground 150 and/or the gravity vector 152, thereby maintaining an orientation between the device 252 and the ground 150 on which the header 200 is positioned and/or the gravity vector 152. For example, the gimbal 258 may include accelerometer(s) that detect acceleration forces (e.g., motion) of the device 252 and/or motor(s) configured to adjust the device 252 to maintain the angle between the axis 255 and the ground 150 on which the header 200 is positioned and/or the gravity vector 152 as the arm 227 rotates relative to the frame 201. For example, an electronic controller of the gimbal 258 may receive signals from the accelerometer(s) and output control signals to the motor(s) to adjust the device 252.

In some embodiments, the gimbal 258 may be configured to enable movement (e.g., rotation) of the device 252 about the lateral axis 140 (e.g., pitch direction), the longitudinal axis 142 (e.g., a roll direction) and/or about the vertical axis 144 (e.g., a yaw direction). In some embodiments, the gimbal 258 may be configured to block movement of the device 252 in the roll direction and/or in the yaw direction. As shown, the gimbal 258 is rigidly coupled to the device 252 and pivotally coupled to an end 259 (e.g., distal end) of the support structure 251 via a first pivot joint 257. An end 237 (e.g., proximal end) of the arm 227 is also pivotally coupled to the frame 201 of the header 200 via a second pivot joint 238 (e.g., arm-to-frame pivot joint). By enabling movement of the device 252 in the pitch direction (e.g., approximately 180 degrees), the device mounting assembly 250 may enable the device 252 to monitor the ground 150 and terrain features of the ground 150 while the device mounting assembly 250 is in the extended position 230 and the retracted position 231. By blocking movement of the device 252 in the roll and/or yaw directions, the device mounting assembly 250 may reduce an effect of a changing contour of the ground 150, such as due to being on side slopes of the ground 150, on the ability of the device 252 to point downward toward the ground 150 to monitor the terrain features.

In certain embodiments, the device mounting structure 256 may include other components in addition to or in place of the gimbal 258 and configured to maintain the device 252 pointing downward toward the ground 150 and/or to maintain the angle between the device 252 and the ground 150 and/or the gravity vector 152. For example, the device mounting structure 256 may include an actuator coupled to the support structure 251 and the device 252. The actuator may be configured to drive rotation of the device 252 relative to the support structure 251 and/or to otherwise adjust (e.g., rotate) the device 252 transition the device 252 between a first position 260 in the extended position 230 and a second position 262 in the retracted position 231 (e.g., via control by an electronic controller, in response to an input signal that indicates an adjustment between the extended position 230 and the retracted position 231).

In the illustrated embodiment, the first arm portion 232 and the second arm portion 233 are joined at a bend 239 that faces downwardly (e.g., toward a soil surface 240 of the ground 150) and that has an angle 241 (e.g., angle between respective central axes of the first arm portion 232 and the second arm portion 233). Additionally, the first portion 253 and the second portion 254 are joined at a bend 267 that faces upwardly in FIG. 3 (e.g., away from the soil surface 240, opposite from the bend 239) and downwardly in FIG. 4 and that has an angle 268 (e.g., angle between respective central axes of the first portion 253 and the second portion 254). As shown, the angles 241, 268 may be approximately equal to one another (e.g., within 1, 2, 3, 4, or 5 percent to account for manufacturing variability). In some embodiments, the angles 241, 268 may be obtuse angles and may be approximately 120, 125, 130, 135, 140, 145, or 150 degrees. In some embodiments, the angles 241, 268 may be between approximately 95-150 degrees, 105 to 140 degrees, or 115 to 130 degrees. In the illustrated embodiment, the portions of the arm 227 and the portions of the support structure 251 have corresponding lengths (e.g., axial lengths, along respective central axes). In particular, a length of the first arm portion 232 is approximately equal to a length of the second portion 254, and a length of the second arm portion 233 is approximately equal to a length of the first portion 253. However, it should be appreciated that the arm 227 and the support structure 251 may have any of a variety of geometries that enable the reel assembly 220 to cause the device 252 to monitor the ground 150 and/or to maintain the orientation relative to the ground 150 and/or the gravity vector 152 while the device mounting assembly 250 is in the extended position 230 and in the retracted position 231. Indeed, the angles 241, 268 may each be any of a variety of angles and/or may not be approximately equal to one other (e.g., may be substantially different from one another). Furthermore, the portions of the arm 227 and the portions of the support structure 251 may not have corresponding lengths (e.g., may be substantially different from one another).

With the disclosed features, when the device mounting assembly 250 pivots about the joint assembly 229 (e.g., as shown by arrows 245) to move between the extended position 230 and the retracted position 231, the device 252 moves between the first position 260 and the second position 262, respectively. For example, the device 252 pivots with the device mounting structure 256 and relative to the support structure 251, such that the device mounting assembly 250 maintains the device 252 in an orientation to monitor the ground 150 and/or maintains the angle of the device 252 relative to the ground 150 and/or the gravity vector 152 (e.g., in both the first position 260 corresponding to the extended position 230 and the second position 262 corresponding to the retracted position 231).

As illustrated, the first position 260 of the device 252 is forward of the cutter bar assembly 210 and the frame 201 of the header 200 along the longitudinal axis 142 (e.g., relative to the direction of travel 146 of the header 200). Additionally, the second position 262 of the device 252 is rearward of the cutter bar assembly 210 and the frame 201 of the header 200 along the longitudinal axis 142 (e.g., relative to the direction of travel 146 of the header 200). Accordingly, when the device 252 is a sensor, the device mounting assembly 250 may enable the sensor to detect terrain features in a particular region relative to the header 200 (e.g., forward or rearward of the frame 201 of the header 200)

regardless of the position of the device 252 relative to the frame 201 of the header 200, for example. When the device 252 is a light source, maintaining the orientation in this way may enable the light source to illuminate terrain features in a particular region of the soil surface 240 relative to the header 200 (e.g., to always illuminate a region forward or rearward of the frame 201 of the header 200), for example. Additionally, the retracted position 231 of the device mounting assembly 250 may enable a compact configuration of the header 200 while still providing sensing and/or illumination of such terrain features.

In certain embodiments, the second position of the device (e.g., the position of the device with the device mounting assembly in the retracted position) may not be behind the cutter bar assembly or behind the frame of the header relative to the direction of travel. In such embodiments, the second position of the device may still be closer to a center of mass of the header relative to the first position of the device with the device mounting assembly in the extended position. For example, the second position of the device may be forward of the cutter bar assembly and/or forward of the frame relative to the direction of travel and also be closer to the center of mass of the header relative to the first position of the device. In some embodiments, the second position of the device with the device mounting assembly in the retracted position may be rightward or leftward relative to the first position of the device (e.g., along the lateral axis).

Figure 5:
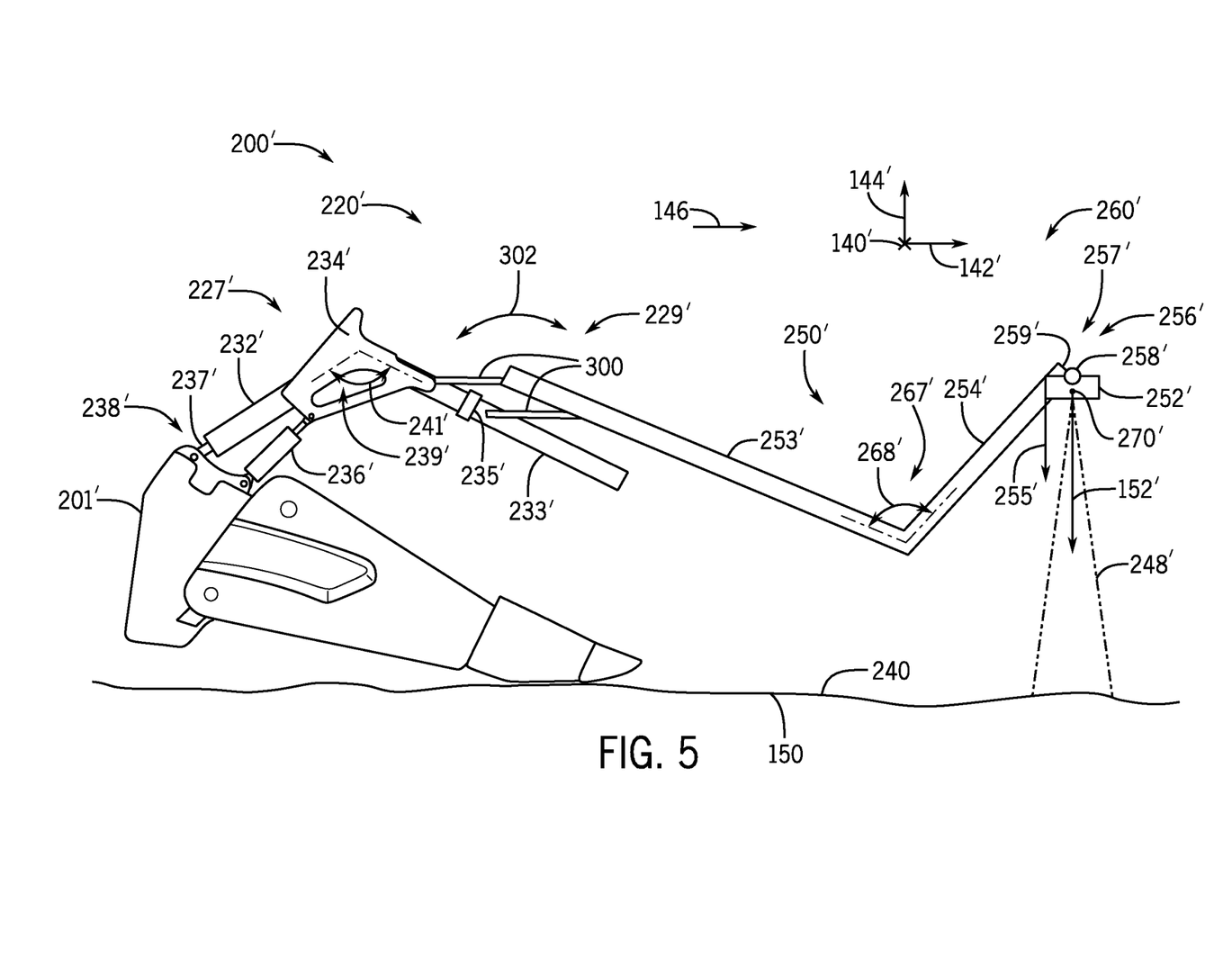
FIG. 5 is a side view of another embodiment of a portion of the header of FIG. 2, in which a reel assembly having a device mounting assembly is in an extended position relative to a frame of the header, in accordance with embodiments of the present disclosure.
Figure 6:
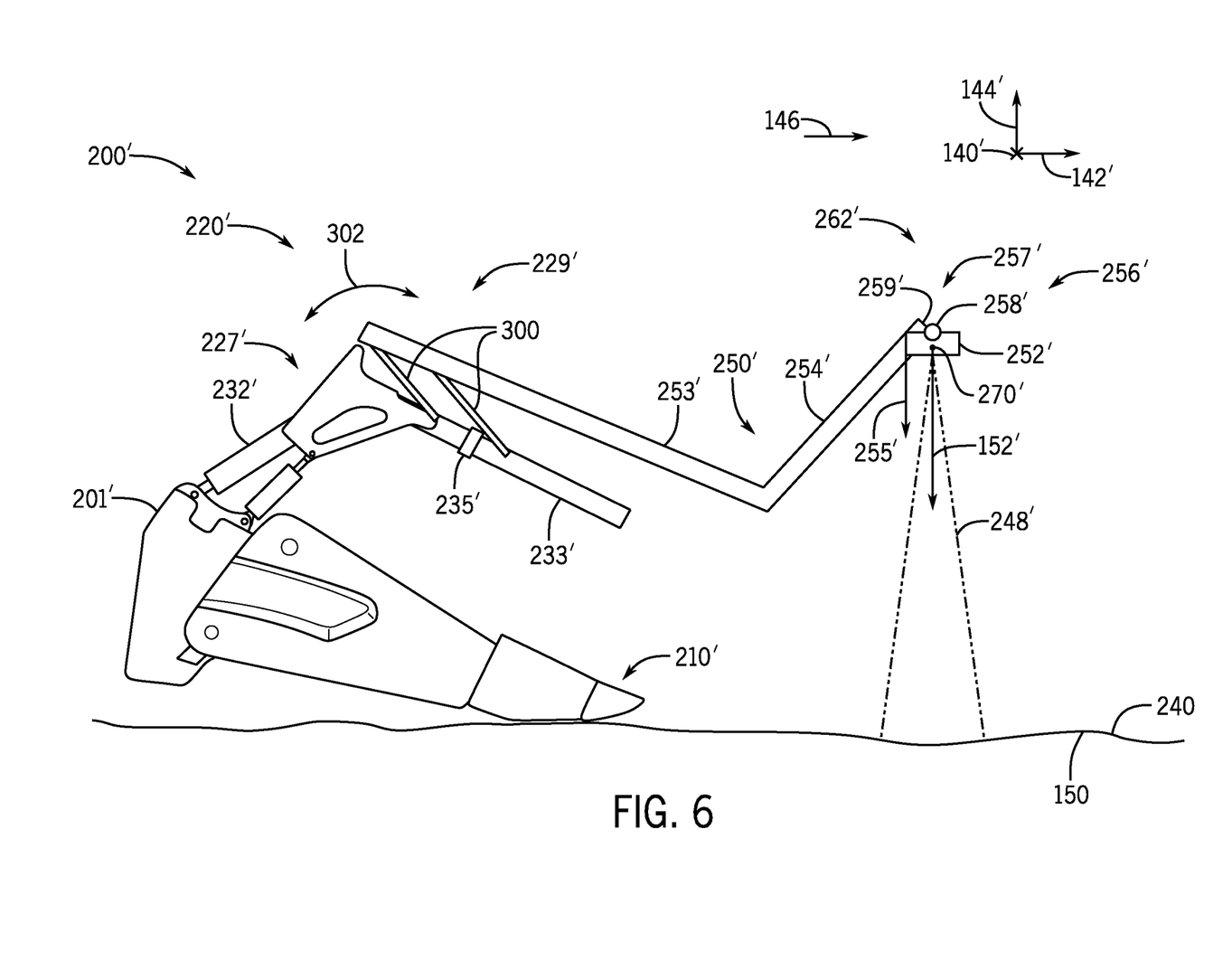
FIG. 6 is a side view of the portion of the header of FIG. 5, in which the reel assembly having the device mounting assembly is in a retracted position relative to the frame of the header, in accordance with embodiments of the present disclosure.

It should be appreciated that various other configurations and components of the reel assembly 220 may enable the device mounting assembly 250 to move between the extended position 230 and the retracted position 231. For example, FIG. 5 is a side view of a portion of a header 200', in which a device mounting assembly 250' of a reel assembly 220' is in an extended position 230' relative to an arm 227' and a frame 201' of the header 200'. FIG. 6 is a side view of the portion of the header 200' with the device mounting assembly 250' in a retracted position 231' relative to the arm 227' and the frame 201' of the header 200'. In certain embodiments, the device mounting assembly 250' may be disposed in the extended position 230' during operation of the header 200', such as during a harvesting operation and while the header 200' is moving over/along the ground 150 and forward along the longitudinal axis 142' (e.g., in the direction of travel 146). In some embodiments, the device mounting assembly 250' may be disposed in the retracted position 231' during transportation of the header 200' and/or during operation of the header 200'. For example, the retracted position 231' may provide a more compact configuration of the header 200' relative to the extended position 230', thereby facilitating transportation (e.g., loading, unloading, maneuvering) of the header 200'. Additionally, the retracted position 231' may provide a more compact configuration of the header 200' relative to the extended position 230' during a harvesting operation, such as while the header 200' is traveling adjacent to obstacles (e.g., a fence, vegetation, rocks, a roadway, and/or other obstacles) within and/or adjacent to a field, thereby facilitating movement of the header 200' during the harvesting operation.

The arm 227' includes a first arm portion 232' and a second arm portion 233' that are coupled together (e.g., in a fixed position relative to one another). In the illustrated embodiment, the first arm portion 232' and the second arm portion 233' are coupled together another via one or more plates 234' (e.g., on opposite lateral sides of the arm portions 232', 233'), although the first arm portion 232' and the second arm portion 233' may be coupled together via any suitable fasteners (e.g., bolts, pins, welds).

It should be appreciated that the arm 227' may have any of a variety of shapes or configurations. For example, the first arm portion 232' and the second arm portion 233' may be physically separate structures that are coupled together, or the first arm portion 232' and the second arm portion 233' may be formed as a one-piece structure. Furthermore, the arm 227' may be formed from any number of portions (e.g., 1, 2, 3, 4, 5, or more) having any of a variety of dimensions (e.g., lengths). Moreover, the arm 227' may have any number (e.g., 1, 2, 3, 4, 5, or more) of bends and/or the arm portions may be positioned at any of a variety of angles relative to one another. The reel 221 (FIG. 2) may be coupled to the arm 227' via a slide 235' (e.g., carriage) that enables the reel 221 to slide along the second arm portion 233' to move along the longitudinal axis 142' relative to the frame 201' of the header 200'. To facilitate discussion and for image clarity, the reel 221 and the other associated components that couple the reel 221 to the arm 227' are omitted in FIGS. 5 and 6.

The header 200' includes an actuator 236' that may be controlled (e.g., via an electronic controller and/or manually via an operator) to rotate the arm 227' generally about the lateral axis 140'. As shown, the actuator 236' extends between the frame 201' of the header 200' and the one or more plates 234', although the actuator 236' may be positioned at any suitable location and may be coupled to any suitable structures (e.g., the first arm portion 232', the second arm portion 233') to drive rotation of the arm 227' about the lateral axis 140'.

In the illustrated embodiment, the device mounting assembly 250' includes the support structure 251' and the device 252', which may have a field of view of detection 248'. The support structure 251' includes a first portion 253' and a second portion 254' that are coupled together (e.g., in a fixed position relative to one another). In the illustrated embodiment, the first portion 253' and the second portion 254' are formed as a one-piece structure. However, the first portion 253' and the second portion 254' may be physically separate structures that are coupled together another via any suitable fasteners (e.g., plates, bolts, pins, welds). It should also be appreciated that the support structure 251' may have any of a variety of shapes or configurations. For example, the support structure 251' may be formed from any number of portions (e.g., 1, 2, 3, 4, 5, or more) having any of a variety of dimensions (e.g., lengths). Moreover, the support structure 251' may have any number (e.g., 1, 2, 3, 4, 5, or more) of bends and/or the portions may be positioned at any of a variety of angles relative to one another.

As shown, the support structure 251' is coupled to the arm 227' via a joint assembly 229' of the device mounting assembly 250'. The joint assembly 229' includes linkages 300 (e.g., parallel linkages) rotatably coupled to the arm 227' and the support structure 251', such that the support structure 251' is configured to rotate, as indicated by arrows 302, about the lateral axis 140' and relative to the arm 227' between the extended position 230' and the retracted position 231'. In particular, each linkage 300 is rotatably coupled to the second arm portion 233' of the arm 227' and to the first portion 253' of the support structure 251'. The device mounting assembly 250' is configured to move forward to the extended position 230' of FIG. 5 and rearward to the retracted position of FIG. 6, via the joint assembly 229'. As illustrated, the joint assembly 229' includes two linkages 300. In other embodiments, the joint assembly 229' may include more or fewer linkages 300 (e.g., 1, 3, 4, 5, 10 linkages 300) rotatably coupled to the arm 227' and the support structure 251'.

The device mounting assembly 250' includes a device mounting structure 256' coupled to the device 252' and the support structure 251'. The device mounting structure 256' is configured to point the device downward at the ground 150 in both the extended position 230' and the retracted position 231' of the device mounting assembly 230', thereby enabling the device 252' to detect and/or to monitor the terrain features in both the extended position 230' and the retracted position 231' and/or during movement between the extended position 230' and the retracted position 231'. For example, the device mounting structure 256' may be configured to maintain an orientation of the device 252' relative to the ground 150 and/or the gravity vector 152' while the device mounting assembly 250' is in the extended position 230' and the retracted position 231'. In particular, an angle (e.g., device-to-ground angle) may be maintained between an axis 255' (e.g., a device axis) of the device 252' and the ground 150 and/or between the axis 255 of the device 252 and the gravity vector 152'. The axis 255' of the device 252' may be at any suitable angle relative to the ground 150 and/or the gravity vector 152'.

As illustrated, the gravity vector 152' extends generally from a center of mass 270' of the device 252' toward the ground 150. In certain embodiments, the gravity vector 152' may extend from another portion of the device 252' and/or another portion of the header 200'. In some embodiments, the gravity vector 152' may extend from the center of mass 270' of the device 252' toward the center of Earth. In certain embodiments, the center of mass 270' may be a center of mass of the device mounting structure 251' and/or of the device mounting assembly 250'.

As shown, the device mounting structure 256' of the device mounting assembly 250' includes a gimbal 258' configured to maintain the angle between the axis 255' and the ground 150 on which the header 200' is positioned and/or the gravity vector 152'. The gimbal 258' may include accelerometer(s) and/or motor(s) that enable the gimbal 258' to operate in the manner discussed above. In certain embodiments, the device mounting structure 256' may include other components in addition to or in place of the gimbal 258'. For example, the device mounting structure 256' may include any suitable components that are configured to adjust the device 252' to point toward the ground 150 and/or to maintain the angle between the device 252' and the ground 150 and/or the gravity vector 152'. For example, the device mounting structure 256' may include an actuator coupled to the support structure 251' and the device 252'. The actuator may be configured to drive rotation of the device 252' relative to the support structure 251' and/or to otherwise adjust (e.g., rotate) the device 252' transition the device 252' between a first position 260' in the extended position 230' and a second position 262' in the retracted position 231'.

In the illustrated embodiment, the first arm portion 232' and the second arm portion 233' are joined at a bend 239' that faces downwardly (e.g., toward a soil surface 240 of the ground 150) and that has an angle 241' (e.g., angle between respective central axes of the first arm portion 232' and the second arm portion 233'). Additionally, the first portion 253' and the second portion 254' are joined at a bend 267' that faces upwardly (e.g., away from the soil surface 240, opposite from the bend 239') and that has an angle 268' (e.g., angle between respective central axes of the first portion 253' and the second portion 254'). As shown, the angles 241', 268' may be approximately equal to one another (e.g., within 1, 2, 3, 4, or 5 percent to account for manufacturing variability). In some embodiments, the angles 241', 268' may be obtuse angles and may be approximately 120, 125, 130, 135, 140, 145, or 150 degrees. In some embodiments, the angles 241', 268' may be between approximately 95-150 degrees, 105 to 140 degrees, or 115 to 130 degrees. In the illustrated embodiment, the portions of the arm 227' and the portions of the support structure 251' have corresponding lengths (e.g., axial lengths, along respective central axes). In particular, a length of the first arm portion 232' is approximately equal to a length of the second portion 254', and a length of the second arm portion 233' is approximately equal to a length of the first portion 253'. However, it should be appreciated that the arm 227' and the support structure 251' may have any of a variety of geometries that enable the reel assembly 220' to cause the device 252' to maintain the orientation relative to the frame 201' of the header 200' as the device mounting assembly 250 moves between the extended position 230' and the retracted position 231'. Indeed, the angles 241', 268' may each be any of a variety of angles and/or may not be approximately equal to one other (e.g., may be substantially different from one another). Furthermore, the portions of the arm 227' and the portions of the support structure 251' may not have corresponding lengths (e.g., may be substantially different from one another).

With the disclosed features, when the device mounting assembly 250' pivots via the joint assembly 229' (e.g., as shown by arrows 302) to move between the extended position 230' and the retracted position 231', the device 252' moves between the first position 260' and the second position 262', respectively. Additionally, the device 252' may pivot with the device mounting structure 256' and/or relative to the support structure 251', such that the device mounting assembly 250' points the device 252' downward toward the ground 150 and/or maintains the angle of the device 252' relative to the ground 150 and/or the gravity vector 152' (e.g., in both the first position 260' corresponding to the extended position 230' and the second position 262' corresponding to the retracted position 231').

As illustrated, the first position 260' and the second position 262' of the device 252' is forward of the cutter bar assembly 210' and the frame 201' of the header 200' along the longitudinal axis 142' (e.g., relative to the direction of travel 146 of the header 200'). Accordingly, when the device 252' is a sensor, the device mounting assembly 250' may enable the sensor to detect terrain features in a particular region relative to the header 200' (e.g., forward of the cutter bar assembly 210' of the header 200') regardless of the position of the device 252' relative to the frame 201' of the header 200', for example. When the device 252' is a light source, maintaining the orientation in this way may enable the light source to illuminate terrain features in a particular region of the soil surface 240 relative to the header 200' (e.g., to always illuminate a region forward of the cutter bar assembly 210' of the header 200'), for example. Additionally, the retracted position 231' of the device mounting assembly 250' may enable a compact configuration of the header 200' while still providing sensing and/or illumination of such terrain features.

In certain embodiments, the reel assembly may include other configurations and components that enable the device mounting assembly to move between the extended position and the retracted position. For example, the reel assembly may include an actuator coupled to the second arm portion of the arm and the first portion of the support structure of the device mounting assembly. The actuator may enable the device mounting assembly to extend or retract (e.g., generally linearly) relative to the arm to move between the extended position and the retracted position relative to the arm. Additionally or alternatively, the second arm portion of the arm and the first portion of the support structure of the device mounting assembly may form a telescopic arm. For example, the second arm portion of the arm may be configured to slide out of or into the first portion of the support structure to move between the extended position and retracted position, or the first portion of the support structure may be configured to slide out of or into the second arm portion of the arm.

As noted above, the support structure may support any number of devices (e.g., 1, 2, 3, 4, 5 or more) and any of a variety of devices, such as any of a variety of devices that emit electromagnetic waves (e.g., sensors; emitters; sources of visible light). For example, the device may be replaced by any other type of device, such as a source of visible light. Furthermore, the device and one or more additional devices, such as a source of visible light, may be rigidly coupled to (e.g., in a fixed position relative to) the device mount disclosed herein. In such cases, the device and the one or more additional devices may each maintain their respective orientation relative to the ground 150 and/or the gravity vector 152' as the arms move relative to the frame of the header. In certain embodiments, the device may include an ultrasonic sensor, a Radio Detection and Ranging (radar) sensor, a Light Detecting and Ranging (lidar) sensor, and/or a camera sensor.

In embodiments with the device including a source of visible light, the device may be oriented to direct light rearwardly (e.g., relative to the direction of travel 146) and downwardly (e.g., toward the ground). Such a configuration may enable the source of visible light to illuminate the ground, at least a portion of the cutter bar assembly of the agricultural header, at least a portion of the reel assembly of the agricultural header, and/or other portions of the agricultural header. However, it should be appreciated that the source of visible light may be positioned at any of a variety of locations along the support structure of the device mounting assembly and/or may have any of a variety of orientations. Furthermore, multiple sources of visible light and/or other devices may be positioned at any of a variety of locations along the support structure and may have any of a variety of orientations relative to the support structure.

It should also be appreciated that any of the devices disclosed herein (e.g., the device 252, 252', and any other device) may include a power source (e.g., battery) and/or may be coupled to a power source (e.g., via a power cable). Furthermore, these components may be coupled to an electronic controller having a processor and a memory. The electronic controller may control operation of the device and/or processes signals received from the device. For example, the electronic controller may control operation of the device and may also receive signals from the device. The processor may process the signals to determine the terrain features, such as a presence of rocks on the ground and/or a height of the crops, and then may provide control signals to adjust the cutter bar assembly to an appropriate height based on the terrain features, for example. In such cases, the processor may be any suitable type of computer processor or microprocessor capable of executing computer-executable code. The processor may also include multiple processors that may perform the operations described herein. The memory may represent non-transitory computer-readable media (e.g., any suitable form of memory or storage) that may store the processor-executable code used by the processor to perform various techniques described herein. It should be noted that non-transitory merely indicates that the media is tangible and not a signal.

While the disclosed embodiments relate to the device mounting assembly that is configured to mount the device to the arm that supports the reel to facilitate discussion, it should be appreciated that the device mounting assembly may be used to mount the device to an arm (e.g., support structure) that is movably attached or non-movably attached to another part of the header or the harvester (e.g., the frame of the header, the chassis or other structure of the harvester). For example, a first end portion of an arm may be coupled to the frame of the header to position the device forward of the cutter bar assembly, and the device mounting assembly (e.g., the gimbal disclosed herein) may be coupled to a second end portion of the arm and may be configured to maintain the orientation of the device relative to the ground and/or the gravity vector.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel assembly for an agricultural header, comprising:
    a reel arm coupled to a frame of the agricultural header and supports a reel of the reel assembly; and
    a device mounting assembly moveably coupled to the reel arm and supports a device that monitors a terrain feature, wherein the device mounting assembly moves between an extended position and a retracted position relative to the frame to move the device between a first position corresponding to the extended position of the device mounting assembly and a second position corresponding to the retracted position of the device mounting assembly, wherein the second position of the device is rearward of the frame of the agricultural header relative to a direction of travel, and wherein the device mounting assembly enables the device to monitor the terrain feature at the first position of the device and at the second position of the device,
    wherein the device mounting assembly enables movement of the device relative to the frame of the agricultural header in a pitch direction while the device is disposed in the first position and in the second position.

2. The reel assembly of claim 1, wherein the first position of the device is forward of a cutter bar assembly of the agricultural header relative to the direction of travel.

3. The reel assembly of claim 1, comprising the device, wherein the device comprises a sensor that detects the terrain feature at the first position of the device and at the second position of the device.

4. The reel assembly of claim 3, wherein the sensor emits electromagnetic waves to facilitate monitoring the terrain feature forward of a cutter bar assembly of the agricultural header.

5. The reel assembly of claim 1, wherein the device mounting assembly maintains an orientation between the device and a ground on which the agricultural header is positioned at the first position and at the second position.

6. The reel assembly of claim 1, comprising a joint assembly, wherein the reel arm is coupled to the device mounting assembly via the joint assembly, and wherein the joint assembly enables the device mounting assembly to adjust between the extended position in which the first position of the device is forward of a cutter bar assembly of the agricultural header relative to the direction of travel and the retracted position in which the second position of the device is rearward of the cutter bar assembly relative to the direction of travel.

7. The reel assembly of claim 6, wherein the joint assembly enables the device mounting assembly to fold relative to a ground surface and rearwardly relative to the direction of travel to reach the retracted position.

8. A device mounting assembly for an agricultural header, comprising:
a support structure coupled to an arm of the agricultural header;
a device mounting structure coupled to the support structure; and
a device coupled to the device mounting structure and monitors a terrain feature, wherein the support structure moves between an extended position and a retracted position relative to a frame of the agricultural header to move the device between a first position corresponding to the extended position and a second position corresponding to the retracted position, wherein the second position of the device is rearward of the frame of the agricultural header relative to a direction of travel, and wherein the device mounting assembly maintains an orientation between the device and a ground on which the agricultural header is positioned at the first position of the device and at the second position of the device.

9. The device mounting assembly of claim 8, wherein the device mounting structure blocks movement of the device relative to the frame of the agricultural header in a roll direction and in a yaw direction while the device is disposed in the first position and in the second position.

10. The device mounting assembly of claim 8, wherein the device mounting structure enables movement of the device relative to the frame of the agricultural header in a pitch direction while the device is disposed in the first position and in the second position.

11. The device mounting assembly of claim 8, wherein the device comprises at least one of an ultrasonic sensor, a Radio Detection and Ranging (radar) sensor, a Light Detecting and Ranging (lidar) sensor, a camera sensor, or a combination thereof.

12. The device mounting assembly of claim 8, wherein the first position of the device is forward of a cutter bar assembly of the agricultural header relative to the direction of travel.

13. The device mounting assembly of claim 8, wherein the device mounting structure comprises a gimbal.

14. A header for an agricultural harvester, comprising:
a cutter bar assembly coupled to a frame of the header and cuts crops as the agricultural harvester travels through a field;
an arm coupled to the frame of the header; and
a device mounting assembly moveably coupled to the arm and supports a device that monitors a terrain feature, wherein the device mounting assembly moves between an extended position and a retracted position relative to the frame, and the device mounting assembly positions the device to enable the device to monitor the terrain feature while the device mounting assembly is in the extended position and in the retracted position,
wherein the device mounting assembly positions the device rearward of the cutter bar assembly relative to a direction of travel while the device mounting assembly is in the retracted position.

15. The header of claim 14, wherein the arm supports a reel of a reel assembly that rotates to prepare the crops to be cut by the cutter bar assembly as the agricultural harvester travels through the field.

16. The header of claim 14, wherein the device mounting assembly maintains an orientation between the device and a ground on which the header is positioned as the device mounting assembly moves between the extended position and the retracted position.

* * * * *